United States Patent [19]
Akahori

[11] Patent Number: 5,294,922
[45] Date of Patent: Mar. 15, 1994

[54] DATA DISPLAY RADIO PAGER

[75] Inventor: Masaaki Akahori, Tokyo, Japan

[73] Assignee: NEC Corporation, Tokyo, Japan

[21] Appl. No.: 814,463

[22] Filed: Dec. 30, 1991

[30] Foreign Application Priority Data

Dec. 29, 1990 [JP] Japan ................................. 2-418501

[51] Int. Cl.⁵ .............................................. H04Q 1/00
[52] U.S. Cl. ............................ 340/825.44; 340/825.22
[58] Field of Search ........... 340/825.44, 311.1, 825.22; 455/31.4; 379/56, 57

[56] References Cited

U.S. PATENT DOCUMENTS

| | | | |
|---|---|---|---|
| 4,358,640 | 11/1982 | Murray | 379/200 |
| 4,422,071 | 12/1983 | de Graaf | 340/825.44 |
| 4,910,510 | 3/1990 | Davis et al. | 340/825.44 |
| 4,922,221 | 5/1990 | Sato et al. | 340/825.44 |
| 5,012,234 | 4/1991 | Dulaney et al. | 340/825.44 |
| 5,177,478 | 1/1993 | Wagai et al. | 340/825.44 |

Primary Examiner—Donald J. Yusko
Assistant Examiner—Edwin C. Holloway, III
Attorney, Agent, or Firm—Sughrue, Mion, Zinn, Macpeak & Seas

[57] ABSTRACT

A data display radio pager for receiving a digital paging signal including an address codeword made up of an address bit group and function bits following the address bit group, and a message codeword following the address codeword. A PROM (Programmable Read Only Memory) conventionally incorporated in this type of pager is replaced with an EEPROM (Electrically Erasable Programmable ROM) or similar rewritable memory. The EEPROM allows address codewords designating the pager and alert mode designation codes associated with function bits to be rewritten, as desired.

3 Claims, 2 Drawing Sheets

DATA DISPLAY RADIO PAGER

BACKGROUND OF THE INVENTION

1. Field of the Invention

The present invention relates to a data display radio pager (simply referred to as a pager hereinafter) and, more particularly, to a pager matching a transmission format based on a POCSAG standard system or similar system and including an address codeword made up of a plurality of address bits for designating a called pager and a plurality of function bits for specifying particular alert modes of a called pager, e.g., a tone mode and a message display mode.

2. Description of Prior Art

The POCSAG signal format which the pager of the the present invention typically matches has a 576-bit preamble for bit synchronization, 32-bit synchronization codewords for word synchronization and eight frames each being implemented as a pair of 32-bit codewords. The preamble and frames are transmitted in a batch. In a frame whose first bit (flag bit) is (logical) "1", the second to nineteenth bits, i.e., eighteen bits in total (2/19) serve as address bits which distinguish a called pager from the others. The twentieth and twenty-first bits (20/21) following such eighteen bits are the function bits while the twenty-second to thirty-second bits, i.e., eleven bits in total (22/32) are the check bits for checking transmission errors. A message codeword follows such a 32-bit address codeword. Up to fifteen codewords (7.5 frames) can be transmitted in a single batch with ONE set in their flag bits.

When the POCSAG standard system was in its infancy, the function bits (20/21) were used as call designation bits for designating one of four tones (A call, B call, C call and D call) each being a particular combination of ON and OFF durations of an audible frequency signal (see British Telecom Radio Paging: Specification RC4517 for Tone Page Receivers, Paragraph 5.1). Today, improved and inexpensive liquid crystal display (LCD) devices implement the combined use of alert tone and LCD display. As a result, the function bits are used to specify various alert modes including an alphanumeric message display mode, a numeric message display mode, an alphanumeric preformed message display mode, and a tone only display mode.

On the other hand, a pager of the type described receives a radio frequency (RF) signal from a central station which has been modulated by a digital paging signal made up of the address codeword and a message codeword that follows the address codeword. The pager demodulates the received RF signal to reproduce the digital paging signal and then separates the address codeword and message codeword from the demodulated signal. If the address signal coincides with an address signal assigned to the pager and stored in a memory built in the pager, the pager alerts the user of the pager by, for example, tone, alphanumeric message display or alphanumeric preformed message display as specified by the function bits of the address codeword.

It is a common practice with the above-described type of pager to define a relation between the plurality of alert modes and the function bits by writing codes representative of four kinds of modes corresponding one-to-one to the function bits "00", "01", "10" and "11" in a predetermined area of the memory before shipment from the manufacturer's factory.

However, capabilities available with conventional pagers are limited considering the fact that the subscribers of paging services, i.e., needs are increasingly diversifying. Regarding doctors or lawyers, for example, personal needs will be almost satisfied if the toner only mode and the alphanumeric message display mode are available. However, salesmen of stock companies, for example, need as much alphanumeric message display and preformed alphanumeric message display as possible rather than tone. Since the company operating a paging service can grasp such versatile needs more accurately than the manufacturer, the tendency that the manufacture entrusts the service operating company with the writing of alert mode designation codes in the memory is increasing. More specifically, there is an increasing tendency that the company operating a paging service writes not only the address codeword but also the alert mode designation codes in the memory to meet the varying demands flexibily.

Under such circumstances, it is often required to rewrite the codes stored in the memory built in the pager. However, the conventional pager using a PROM as stated above cannot have the codes thereof rewritten with ease.

BRIEF SUMMARY OF THE INVENTION

Objects of the Invention

It is, therefore, an object of the present invention to provide a pager which allows an address codeword assigned thereto and alert mode designation codes to be readily rewritten.

Summary of the Invention

In accordance with the present invention, a memory built in a pager for storing an address codeword assigned to the pager and alert mode designation codes are implemented as an EEPROM (Electrically Erasable Programmable ROM) or similar rewritable memory in place of a conventional PROM.

Since the address codeword and alert mode designation codes are stored in a rewritable memory as mentioned above, the pager of the invention can accommodate subscriber's various needs. In addition, it is not necessary for the manufactures of pagers to increase the number of types of pagers despite the diversifying demands, resulting in the cut-down of cost.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENT

Figure 1:
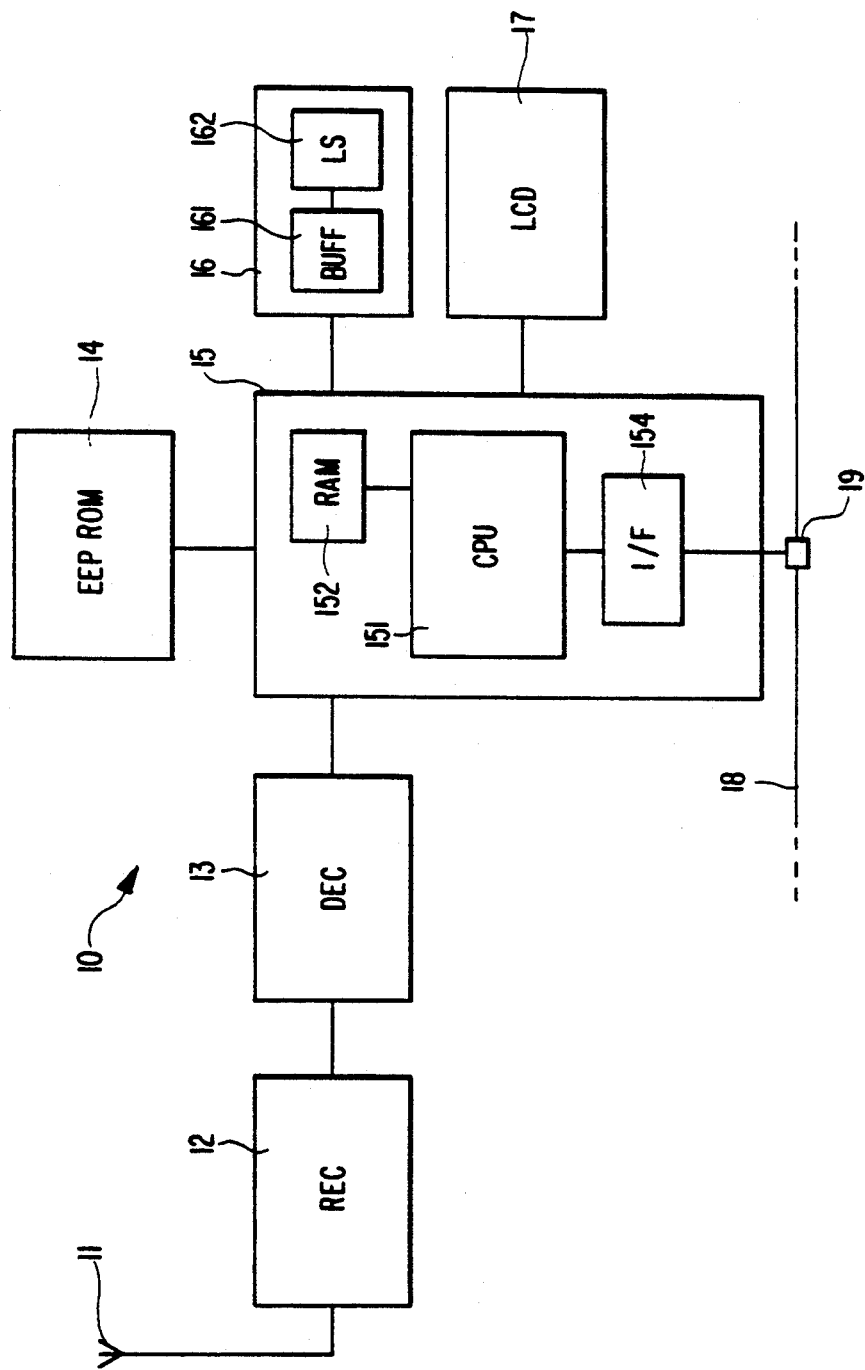
FIG. 1 is a block diagram schematically showing a pager embodying the present invention.

Referring to FIG. 1 of the drawings, a pager, generally 10, embodying the present invention is shown and includes a receiving section 12. A central station, not shown, modulates an RF signal by a digital paging signal and transmits the resulting signal. The receiving section 12 amplifies and demodulates the RF signal coming in through an antenna 11 to thereby produce a baseband signal. A decoder 13 separates a received address codeword from the baseband signal. An EEPROM 14 stores an address codeword assigned to the paper 10 and alert mode designation code (eight kinds of 3-bit codes associated with function bits (20/21). A control section 15 includes a CPU 151 which compares the received address codeword with the assigned address codeword and, if the former is identical with the latter, feeds a tone message to sounding means 16 or a display message to an LCD 17 as instructed by the alert mode designation code. While the EEPROM 14 usually has a memory area great enough to store up to six address codewords on a byte basis (four bytes per codeword) and up to twelve alert mode designation codes, it is assumed to store a single assigned address codeword (thirty-two bits) and four alert mode designation codes (each having three bits) in the embodiment. The EEPROM 14 may additionally store a second to a sixth codeword and four alert mode designation codes (each having three bits) specified by the function bits (20/21) associated with the second address codeword. Such additional storage, however, will not be described herein specifically since it is not relevant to the understanding of the present invention.

The control section 15 has a buffer RAM (Random Access Memory) 152 and an interface 154 in addition to the CPU 151. The interface 154 interfaces the CPU 151 to a data rewriting device 20, which will be described, via a connector terminal 19 provided on the casing 18 of the pager 10. The sounding means 16 has a buffer register or amplifier 161 for temporarily storing a signal fed from the control section 15, and a loudspeaker 162.

Figure 2:
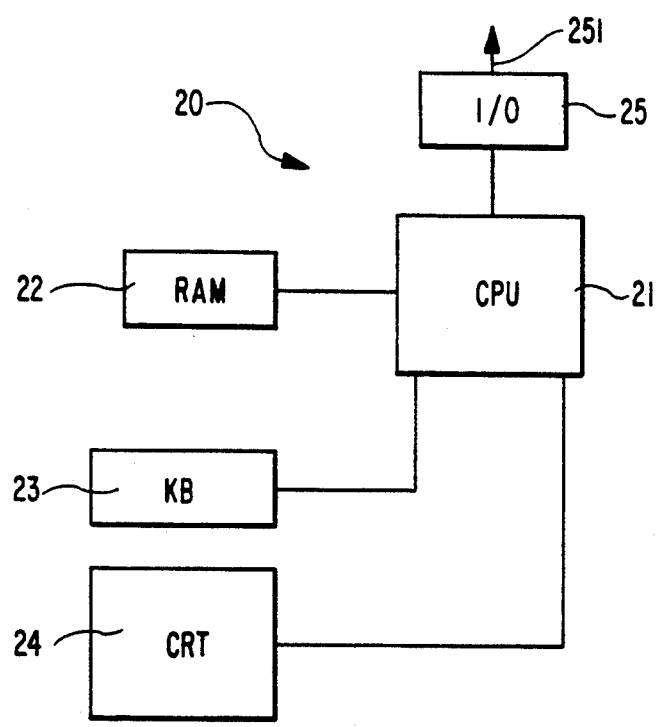
FIG. 2 is a block diagram schematically showing a ROM rewriting device included in the embodiment.

As shown in FIG. 2, the data rewriting device 20 is made up of a CPU 21, a RAM 22 playing the role of a buffer, a keyboard 23 for entering data in the CPU 21, a CRT (Cathode Ray Tube) 24 for displaying data, and an input/output circuit 25 which connects the CPU 21 to the interface circuit 154 via a connector 251 and the terminal 19.

Table 1 shown below lists a specific relation between received addresses and the alert mode designation codes (3 bits×4) defined by the data stored in the EEPROM 14, i.e., the assigned address codeword (thirty-two bits) and the succeeding function bits.

Assume that the person carrying the pager 10 with the EEPROM 14 which stores the above-stated data, i.e., codeword and alert mode designation codes (subscriber) desires to replace the "Tone Only" function with the "Alphanemeric Preformed Message Display" function. Then, it is necessary to change, among the stored data, the alert mode designation code "111" corresponding to the function bits "11" to "110". Likewise, when the person carrying the pager 10 desires to substitute assigned address bits "YYY . . . YY" for "XXX . . . XX" or to add second assigned address bits "ZZZ . . . ZZ", the data has to be rewritten.

To rewrite any of the data stored in the EEPROM 14, the operator inserts the connector 251 into the terminal 19 and then operates the keyboard 23 to send a command for reading the data out of the EEPROM 14 to the CPU 151 via the CPU 21. The data read out of the EEPROM 14 in response to the command are temporarily stored in the buffer RAM 152, transferred to the CPU 21 via the input/output circuit 25, and then displayed on the CRT 24. The operator again operates the keyboard 23 to create desired data on the screen of the CRT 24 while watching the data. Subsequently, the operator enters a command on the keyboard 23 for causing the CPU 151 to write the created data in the EEPROM 14. The created data is written to the RAM 22 of the data rewriting device 20 as well.

Subsequently, for an error checking purpose, the operator operates the keyboard 23 to recall the data written by the above procedure on the CRT 24 via the CPU 15. At the same time, the data stored in the RAM 22 is read out and displayed on the CRT 24 for comparison. This allows the operator to see if the entered data has any error. If the entered data is free from errors, the rewriting procedure is completed.

Various modifications will become possible for those skilled in the art after receiving the teachings of the present disclosure without departing from the scope thereof. For example, while the embodiment has concentrated on a single assigned address codeword (thirty-two bits) and four alert mode designation codes (three bits) associated with the address codeword, it is only illustrative and not limitative. Specifically, even a pager with a ROM capable of storing up to twelve alert mode designation codes is commercially available today. With such a pager, it is also possible to rewrite additional addresses and additional alert mode designation codes according to the specifications of the pager.

The embodiment has been shown and described as receiving a signal having the POCSAG signal format. Obviously, however, the present invention is practicable with any other kind of signal format so long as the address codeword includes address bits and function bits and the function bits designate an alert mode.

TABLE 1

| ADDRESS BITS (2ND-19TH) | FUNCTION BITS (20TH-21ST) | RECEIVED ADDRESS | ALERT MODE DESIGNATE CODE | ALERT MODE |
|---|---|---|---|---|
| XXX . . . XX | 00 | 1A | 100 | Alphanumeric Message Display |
|  | 01 | 1B | 101 | Numeric Message Display |
|  | 10 | 1C | 110 | Alphanumeric Performed Message Display |
|  | 11 | 1D | 111 | Tone Only |

What is claimed is:

1. A method for rewriting data registered in a data display radio pager, the pager comprising:
   means for receiving an RF signal modulated by a digital paging signal including an address codeword made up of at least one address bit group which designates said pager and at least two function bits following said address bit group, and at least one message codeword following said address codeword and sent from a central station, said means separating said digital paging signal in the form of a received address codeword and a received message codeword;

a rewritable memory storing an assigned codeword assigned to said pager and a plurality of alert mode designation codes each designating respective one of a plurality of alert modes which are designated by said function bits; and control means for feeding predetermined alert start signals to sounding means and data displaying means on detecting the coincidence of said received codeword and said assigned codeword;

said method comprising the steps of:
 (a) connecting a data rewriting device to the radio pager by a connector means;
 (b) reading a content of said rewritable memory in response to a read command inputted from said data rewriting device;
 (c) displaying the read content of said rewritable memory at said data rewriting device;
 (d) inputting a new data by said data rewriting device for replacing the content of said rewritable memory;
 (e) storing said new data in a memory of said data rewriting device;
 (f) rewriting the content of said rewritable memory by storing the new data into said rewritable memory;
 (g) reading new content of said rewritable memory in response to a read command inputted from said data rewriting device; and
 (h) displaying the read new content of said rewritable memory and the new data stored in said memory of the data rewriting device at said data rewriting device to compare the new content of said rewritable memory with the data stored in the memory of said data rewriting device.

2. The method for rewriting data registered in a data display radio pager as claimed in claim 1, further including the step of providing an EEPROM as said rewritable memory.

3. The method for rewriting data registered in a data display radio pager as claimed in claim 1 or 2, further including the step of providing a signal format based on a POCSAG standard system as said digital paging signal.

* * * * *